US009977429B2

(12) United States Patent
Lee et al.

(10) Patent No.: US 9,977,429 B2
(45) Date of Patent: May 22, 2018

(54) METHODS AND SYSTEMS FOR POSITIONING A CAMERA IN AN INCIDENT AREA

(71) Applicant: MOTOROLA SOLUTIONS, INC., Schaumburg, IL (US)

(72) Inventors: Kuan Heng Lee, Pulau Penang (MY); Li Poh Chen, Pulau Pinang (MY); Su Lin Koay, Pulau Pinang (MY); Yen Nee Lee, Penang (MY); Shervin Sabripour, Plantation, FL (US); Soo Fong Tan, Pulau Pinang (MY); Yew Leong Wong, Melaka (MY)

(73) Assignee: MOTOROLA SOLUTIONS, INC., Chicago, IL (US)

(*) Notice: Subject to any disclaimer, the term of this patent is extended or adjusted under 35 U.S.C. 154(b) by 0 days. days.

(21) Appl. No.: 15/146,699

(22) Filed: May 4, 2016

(65) Prior Publication Data

US 2017/0322554 A1    Nov. 9, 2017

(51) Int. Cl.
*G05D 1/00* (2006.01)
*B64C 39/02* (2006.01)
(Continued)

(52) U.S. Cl.
CPC ......... *G05D 1/0088* (2013.01); *B64C 39/024* (2013.01); *G05D 1/0094* (2013.01);
(Continued)

(58) Field of Classification Search
CPC ................. B64C 2201/123; B64C 2201/127
See application file for complete search history.

(56) References Cited

U.S. PATENT DOCUMENTS 9,008,491 B2    4/2015  Kulas
9,108,729 B2    8/2015  Duggan et al.
(Continued)

FOREIGN PATENT DOCUMENTS

WO    2007094802    8/2007
WO    2011004358    1/2011

OTHER PUBLICATIONS

Hinchliffe, "Auto drone cams follow your ride," website article, Jun. 20, 2014, pp. 1-8, http://motorbikewriter.com/auto-drone-cams-follow-ride/.
Kim et al., "Detecting Regions of Interest in Dynamic Scenes with Camera Motions," specification, Jun. 2012, pp. 1-8, http://www.cc.gatech.edu/~irfan/p/2012-Kim-DRIDSWCM.pdf.

*Primary Examiner* — Kevin P Mahne
(74) *Attorney, Agent, or Firm* — Michael Best & Friedrich LLP

(57) ABSTRACT

Methods and systems of positioning a drone including a camera. One method includes generating, from a first image capture position of the drone, a first image or video having a first field of view. The method further includes determining a plurality of regions of interest, each of the plurality of regions of interest located within a predetermined area and having an associated priority. The method further includes determining a second image capture position different from the first image capture position for the drone as a function of the associated priority and a viewing distance of the camera. The method further includes generating a command for the drone to move to the second image capture position. The method further includes moving the drone based on the command. The method further includes generating, from the second image capture position, a second image or video having a second field of view.

14 Claims, 7 Drawing Sheets

(51) Int. Cl.
    *H04N 5/225*     (2006.01)
    *G06T 7/00*      (2017.01)
    *G05D 1/10*      (2006.01)

(52) U.S. Cl.
    CPC ............ *G05D 1/102* (2013.01); *G06T 7/004*
            (2013.01); *G06T 7/0081* (2013.01); *H04N*
            *5/225* (2013.01); *B64C 2201/123* (2013.01);
            *B64C 2201/127* (2013.01); *B64C 2201/141*
            (2013.01); *B64C 2201/146* (2013.01); *G06T*
            *2207/10016* (2013.01); *G06T 2207/10032*
            (2013.01); *G06T 2207/30232* (2013.01); *G06T*
            *2207/30244* (2013.01)

(56)            References Cited

U.S. PATENT DOCUMENTS

| | | |
|---|---|---|
| 2012/0038799 A1 | 2/2012 | Kim |
| 2012/0105634 A1* | 5/2012 | Meidan ............. G08B 13/1965 348/143 |
| 2012/0119879 A1 | 5/2012 | Estes et al. |
| 2014/0057590 A1 | 2/2014 | Romero |
| 2014/0192193 A1 | 7/2014 | Zufferey et al. |
| 2016/0247404 A1* | 8/2016 | Srivastava ............. G01C 21/20 |
| 2016/0314545 A1* | 10/2016 | Jessen ................ G06Q 30/0278 |
| 2017/0003690 A1* | 1/2017 | Tanahashi ............ G05D 1/0011 |
| 2017/0024671 A1* | 1/2017 | McCormack .... G06Q 10/06315 |
| 2017/0053169 A1* | 2/2017 | Cuban ................ G06K 9/00664 |
| 2017/0086428 A1* | 3/2017 | Horton ................ A01K 29/005 |

* cited by examiner

METHODS AND SYSTEMS FOR POSITIONING A CAMERA IN AN INCIDENT AREA

BACKGROUND OF THE INVENTION

Vehicle breakdowns, accidents, attacks on individuals and property, and other incidents may occur such that public safety personnel (for example, police officers, firefighters, and the like) are called to an incident area to help with an incident. It may be helpful to monitor the incident area to provide details of the incident to public safety personnel located at a location remote from the incident area (for example, a command center) in real-time.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
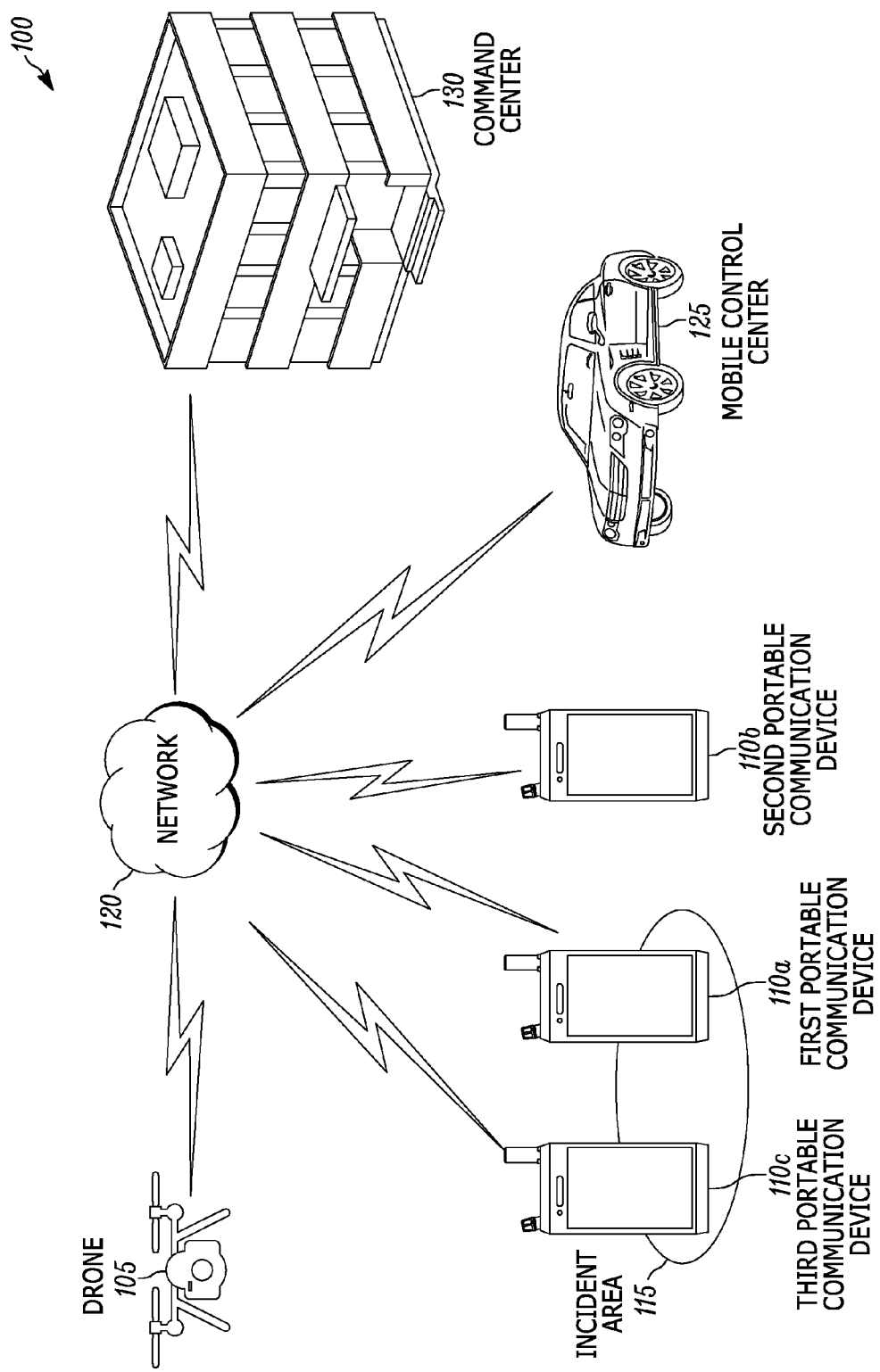
FIG. 1 is a block diagram of a communication system according to one exemplary embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One embodiment provides a method of positioning a drone including a camera. The method includes generating, from a first image capture position of the drone and with the camera, a first image or video having a first field of view. The method further includes determining, with an electronic processor, a plurality of regions of interest, each of the plurality of regions of interest located within a predetermined area and having an associated priority. The method further includes determining, with the electronic processor, a second image capture position relative to and different from the first image capture position for the drone as a function of the associated priority and a viewing distance of the camera. The method further includes generating, with the electronic processor, a command for the drone to move to the second image capture position. The method further includes moving the drone based on the command. The method further includes generating, from the second image capture position and with the camera, a second image or video having a second field of view.

Another embodiment provides a drone including a camera configured to generate, from a first image capture position of the drone, a first image or video having a first field of view. The drone further includes an electronic processor configured to determine a plurality of regions of interest. Each of the plurality of regions of interest is located within a predetermined area and has an associated priority. The electronic processor is further configured to determine a second image capture position relative to and different from the first image capture position for the drone as a function of the associated priority and a viewing distance of the camera. The electronic processor is further configured to generate a command for the drone to move to the second image capture position. The drone moves to the second image capture position based on the command. The camera is configured to generate, from the second image capture position, a second image or video having a second field of view.

FIG. 1 is a block diagram of a communication system 100 according to one exemplary embodiment. The communication system 100 includes a drone 105. In some embodiments, the drone 105 is a pilotless aircraft that navigates autonomously. In some embodiments, the drone 105 is a pilotless aircraft that is remote-controlled by an operator providing remote-controlled guidance. In some embodiments, the drone 105 may operate beyond the line of sight of the operator. The communication system also includes a plurality of portable communication devices. In the example illustrated in FIG. 1, a first portable communication device $110_A$, a second portable communication device $110_B$, and a third portable communication device $110_C$ are shown. In the following description, when explaining how a single portable communication device functions, a reference to portable communication device 110 is used. In addition, when discussing a group of portable communication devices, reference to a plurality of portable communication devices $110_A$ through $110_N$ is used. The subscript N indicates that the plurality of portable communication devices may include more or fewer devices than illustrated in FIG. 1.

The first portable communication device $110_A$, and the third portable communication device $110_C$ are located within an incident area 115. The second portable communication device $110_B$ is located outside the incident area 115. Additional portable communication devices may be located inside the incident area 115 or outside the incident area 115.

In addition to the components already discussed, the communication system 100 includes a network 120, a mobile control center 125, and a command center 130. The drone 105, the portable communication devices $110_A$, $110_B$, and $110_C$, the mobile control center 125, and the command center 130 communicate with each other over the network 120. The network 120 may be a wired or a wireless communication network. All or parts of the network 120 may be implemented using various existing networks, for example, a cellular network, the Internet, a land mobile radio (LMR) network, a Bluetooth™ network, a wireless local area network (for example, Wi-Fi), a wireless accessory Personal Area Network (PAN), a Machine-to-machine (M2M) autonomous network, and a public switched telephone network. The network 120 may also include future developed networks. Although FIG. 1 shows only one of each of the drone 105, the mobile control center 125, and the command center 130, additional drones, mobile control centers, and command centers may be included in the communication system 100 and may communicate over the network 120. In some embodiments, the drone 105 may communicate with other external devices over the network 120. In some embodiments, the drone 105, the plurality of portable communication devices $110_A$ through $110_N$, the mobile control center 125, the command center 130, and other external devices may communicate with each other using other networks or through direct links, for example, a two-way radio channel.

As illustrated in FIG. 1, the portable communication device 110 may be a handheld communication device, such as a mobile telephone, mobile radio, smart watch or other smart wearable, or other portable device configured to communicate over the network 120. In some embodiments, the portable communication device 110 may be a tracking device that is placed on a victim, on an object, or at a location within the incident area 115. The mobile control center 125 and the command center 130 may refer to communication devices within a vehicle and a building, respectively that are used to communicate with other devices over the network 120. For example, the mobile control center 125 may be a mounted communication device installed in a police vehicle or in another vehicle used by public safety personnel. The command center 130 may include one or more networked computers and associated peripherals such as displays, keyboards, and the like located within a public safety facility, such as a police or fire station. The incident area 115 may be a predetermined area within a predetermined distance from a predetermined device (for example, one portable communication device 110) or geographical location (established, for example, using a set of geographic coordinates). One of the plurality of portable communication devices $110_A$ through $110_N$ may be determined to be within the incident area 115 when the portable communication device 110 is, for example, within the predetermined distance (for example, twenty feet) from the geographical location.

Figure 2:
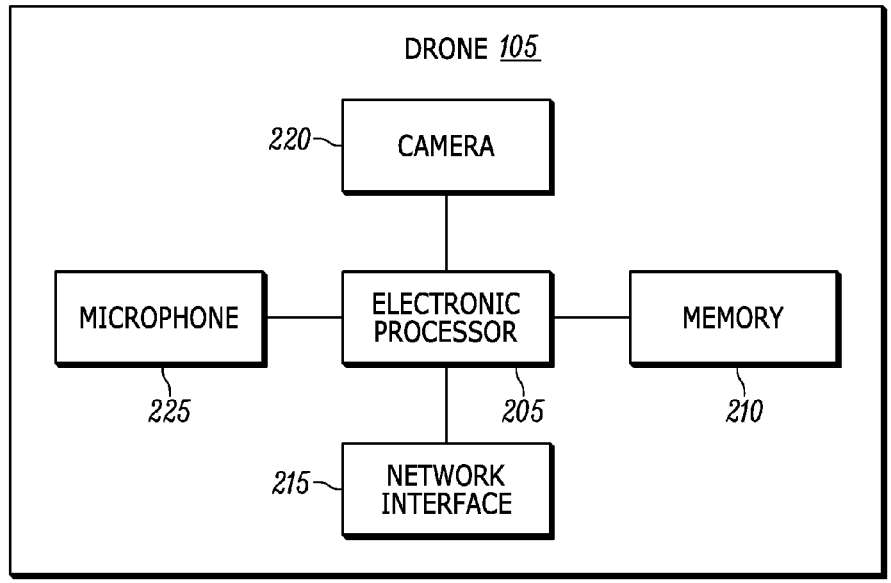
FIG. 2 is a block diagram of a drone included in the communication system of FIG. 1 according to one embodiment.

FIG. 2 is a block diagram of the drone 105 according to one embodiment. In the embodiment illustrated, the drone 105 includes an electronic processor 205 (for example, a microprocessor or other electronic device), a memory 210, a network interface 215, a camera 220, and a microphone 225. In some embodiments, the drone 105 may include fewer or additional components in configurations different from that illustrated in FIG. 2. For example, in some embodiments, the drone 105 may include a transceiver to communicate with the plurality of portable communication devices $110_A$ through $110_N$, the mobile control center 125, or a combination thereof using a communication channel or connection that is outside of the network 120. In some embodiments, the drone 105 may include a global positioning system unit or a similar component that may determine the geographic coordinates of the location of the drone 105. In some embodiments, the drone 105 may perform functionality other than the functionality described below.

The memory 210 may include read only memory (ROM), random access memory (RAM), other non-transitory computer-readable media, or a combination thereof. The electronic processor 205 is configured to receive instructions and data from the memory 210 and execute, among other things, the instructions. In particular, the electronic processor 205 executes instructions stored in the memory 210 to perform the methods described herein. For example, the electronic processor 205 is configured to control movement and, thus, the position, of the drone 105. As a consequence, the combination of the drone 105 and the camera 220 may be referred to as a self-positionable camera.

The network interface 215 sends and receives data to and from the network 120. For example, the network interface 215 may include a transceiver for wirelessly communicating with the network 120. The electronic processor 205 may communicate image or video data generated by the camera 220 over the network 120 through the network interface 215, such as for receipt by the mobile control center 125, the command center 130, or another device remote from the drone 105. In some embodiments, communication of image or video data may occur in approximately real-time. The electronic processor 205 may receive data from the network 120 through the network interface 215, such as from the plurality of portable communication devices $110_A$ through $110_N$, the mobile control center 125, the command center 130, or another external device. Additionally or alternatively, in some embodiments, the electronic processor 205 may receive data through the network interface 215 directly from at least one of the plurality of portable communication devices $110_A$ through $110_N$, the mobile control center 125, the command center 130, or another external device. In some embodiments, geographic coordinates of a plurality of portable communication devices 110 in the incident area 115 (for example, portable communication devices $110_A$ and $110_C$) are communicated from each portable communication device 110 to the drone 105. Additionally or alternatively, in some embodiments, the geographic coordinates of the plurality of portable communication devices 110 in the incident area 115 are communicated to at least one of the mobile control center 125, the command center 130, and another external device.

In some embodiments, the camera 220 is a panoramic camera, which may include a 360-degree field of view camera. In alternate embodiments, the camera 220 may include a plurality of cameras that individually have smaller fields of view than 360 degrees. In such embodiments, the cameras may be placed in different directions that allow for combining images from each camera to generate a field of view that is 360 degrees. In some embodiments, the microphone 225 may be controlled by the electronic processor 205 to face a desired direction to capture audio from (for example, be directed to) a desired direction.

Each of the plurality of portable communication devices $110_A$ through $110_N$, the mobile control center 125, and the command center 130 may include components that are similar to those described above with respect to the drone 105. For example, each of plurality of portable communication devices $110_A$ through $110_N$, the mobile control center 125, and the command center 130 may include an electronic processor, a memory, and a network interface as well as other components, such as global positioning system units or the like.

The methods described below are used to control movement of the drone 105 based on collected data (for example, the geographic coordinates of the portable communication devices 110 located within the incident area 115) and are described as being executed by the electronic processor 205 of the drone 105. However, in some embodiments, such methods may be executed by the electronic processor of at least one of the plurality of portable communication devices 110$_A$ through 110$_N$, the mobile control center 125, the command center 130, or another device remote from the drone 105. For example, at least one of the portable communication devices 110, the mobile control center 125, or the command center 130 may collect data, execute the methods as described below, and communicate instructions over the network 120 to control the movement of the drone 105.

Figure 3:
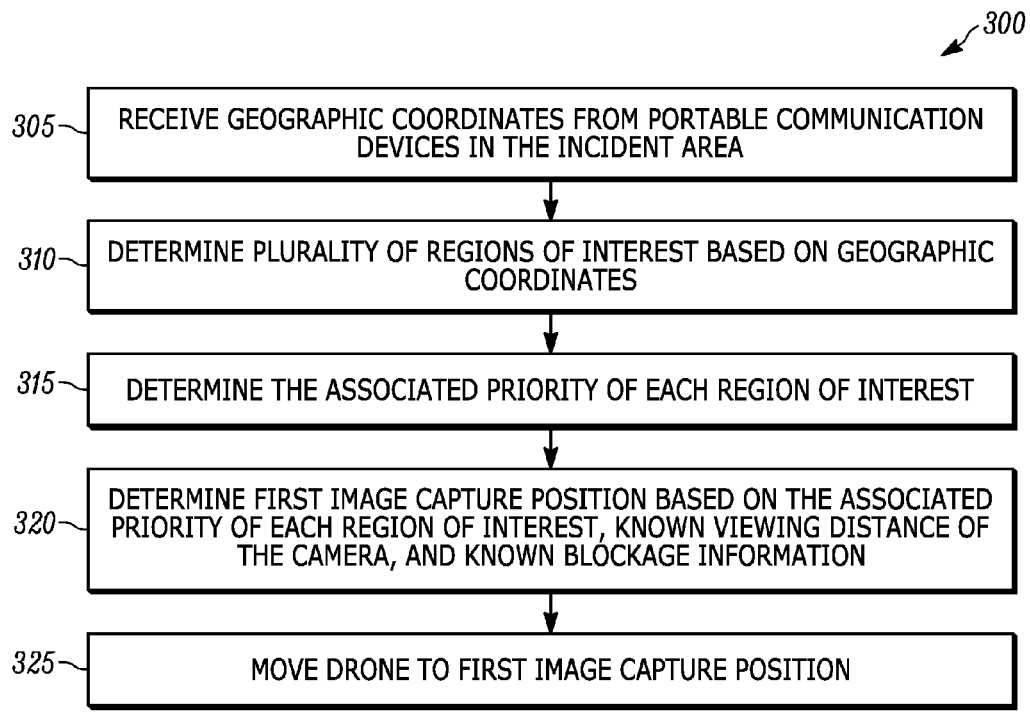
FIG. 3 is a flowchart of a method of initially positioning the drone of FIG. 2 at an incident area to capture image or video data.

FIG. 3 illustrates a method 300 of initially positioning the drone 105 at the incident area 115 to capture image or video data using the camera 220. At block 305, the electronic processor 205 receives the geographic coordinates of each portable communication device 110 located within the incident area 115 over the network 120. At block 310, the electronic processor 205 determines a plurality of regions of interest based on the geographic coordinates of each portable communication device 110 within the incident area 115. For example, in some embodiments, the electronic processor 205 determines that a region of interest exists based on one of the plurality of portable communication devices 110$_A$ through 110$_N$ within the incident area 115 being located within a predetermined distance from another one of the plurality of portable communication devices 110$_A$ through 110$_N$. Additionally or alternatively, in some embodiments, when one of the plurality of portable communication devices 110$_A$ through 110$_N$ is a tracking device, the electronic processor 205 may identify the location or area surrounding the location of the tracking device as a region of interest.

At block 315, the electronic processor 205 determines an associated priority of each region of interest. For example, in some embodiments, the electronic processor 205 may determine the associated priority of each region of interest based on a total amount of combined time that a group of the plurality of portable communication devices 110$_A$ through 110$_N$ has been located at each region of interest during a predetermined time window. Additionally or alternatively, in some embodiments, the electronic processor 205 may determine the associated priority of each region of interest based on a health status of a victim located at each region of interest. For example, such health status may be communicated by a body-mounted or body-worn sensor associated with one of the portable communication devices 110 located at the region of interest. In some embodiments, public safety personnel located within the incident area 115 or located away from the incident area 115 (for example, at a police station) may be able to set an associated priority for a region of interest and communicate the set associated priority to the electronic processor 205.

In some embodiments, the electronic processor 205 characterizes each region of interest as high priority, medium priority, or low priority. For example, in some embodiments, when the total amount of time that a group of the plurality of portable communication devices 110$_A$ through 110$_N$ has been located at a region of interest exceeds or meets a high priority threshold, the electronic processor 205 characterizes the region of interest as a high priority region of interest. When the total amount of time that a group of the plurality of portable communication devices 110$_A$ through 110$_N$ has been located at a region of interest is less than the high priority threshold but exceeds or meets a medium priority threshold, the electronic processor 205 characterizes the region of interest as a medium priority region of interest. When the total amount of time that a group of the plurality of portable communication devices 110$_A$ through 110$_N$ has been located at region of interest is less than the medium priority threshold, the electronic processor 205 characterizes the region of interest as a low priority region of interest.

At block 320, the electronic processor 205 determines a first image capture position of the drone 105 based on the associated priority of each region interest, a known viewing distance of the camera 220, and known blockage information. The known viewing distance of the camera 220 may be estimated depending on the video resolution of the camera 220. For example, in some embodiments, when the camera 220 is able to support horizontal resolution of approximately four thousand pixels (4K resolution), the viewing distance of the camera 220 may be approximately twenty feet. The known blockage information may be obtained from a geographic information system (GIS) map and allows the electronic processor 205 to determine whether it is possible and reasonable to move the drone 105 to the first image capture position. For example, the electronic processor 205 may use the known blockage information to ensure that the first image capture position does not coincide with a structure or other obstruction (for example, a building) that would prevent the drone 105 from being moved to the first image capture position.

In some embodiments, the electronic processor 205 determines the first image capture position of the drone 105 based on the associated priority of each region interest, the known viewing distance of the camera 220, and the known blockage information. For example, the electronic processor 205 may determine the first image capture position for the drone 105 using a score-based system where higher priority regions of interest are assigned larger values. In particular, in some embodiments, the electronic processor 205 determines the first image capture position by cycling through possible locations within the incident area 115 to determine which location would allow for the highest combined priority score of the regions of interest to be captured by the camera 220 based on the known viewing distance. In other words, the electronic processor 205 uses the known viewing distance as a radius of a circle from the possible locations within the incident area 115. The electronic processor 205 then selects the location where the circle defined by the known viewing distance encloses the highest combined priority score of the regions of interest.

After the first image capture position is determined, the electronic processor 205 uses the known blockage information to determine whether the first image capture position coincides with a structure or other known obstacle. When the determined first image capture position coincides with a structure or other known obstacle, the electronic processor 205 then determines another location in a similar manner as described above. The electronic processor 205 repeats this process until a first image capture is determined that does not coincide with a structure or other known obstacle. At block 325, the electronic processor 205 controls the drone 105 such that the drone 105 is moved to the first image capture position.

In alternate embodiments, the initial position of the drone 105 is predetermined and may be received by the drone 105 over the network 120 (for example, from the mobile control center 125, the command center 130, or another remote device). For example, the drone 105 may receive geographic coordinates of an incident area 115 and the electronic processor 205 may control the drone 105 to move to the received geographic coordinates. Once the drone 105 has been positioned at the received geographic coordinates or while the drone 105 is moving to the received geographic coordinates, the electronic processor 205 may determine a viewing location as described above with respect to the method 300. As explained with respect to FIG. 4 hereinafter, the electronic processor 205 may also adjust the position of the drone 105 as the situation at the incident area 115 changes.

Figure 4:
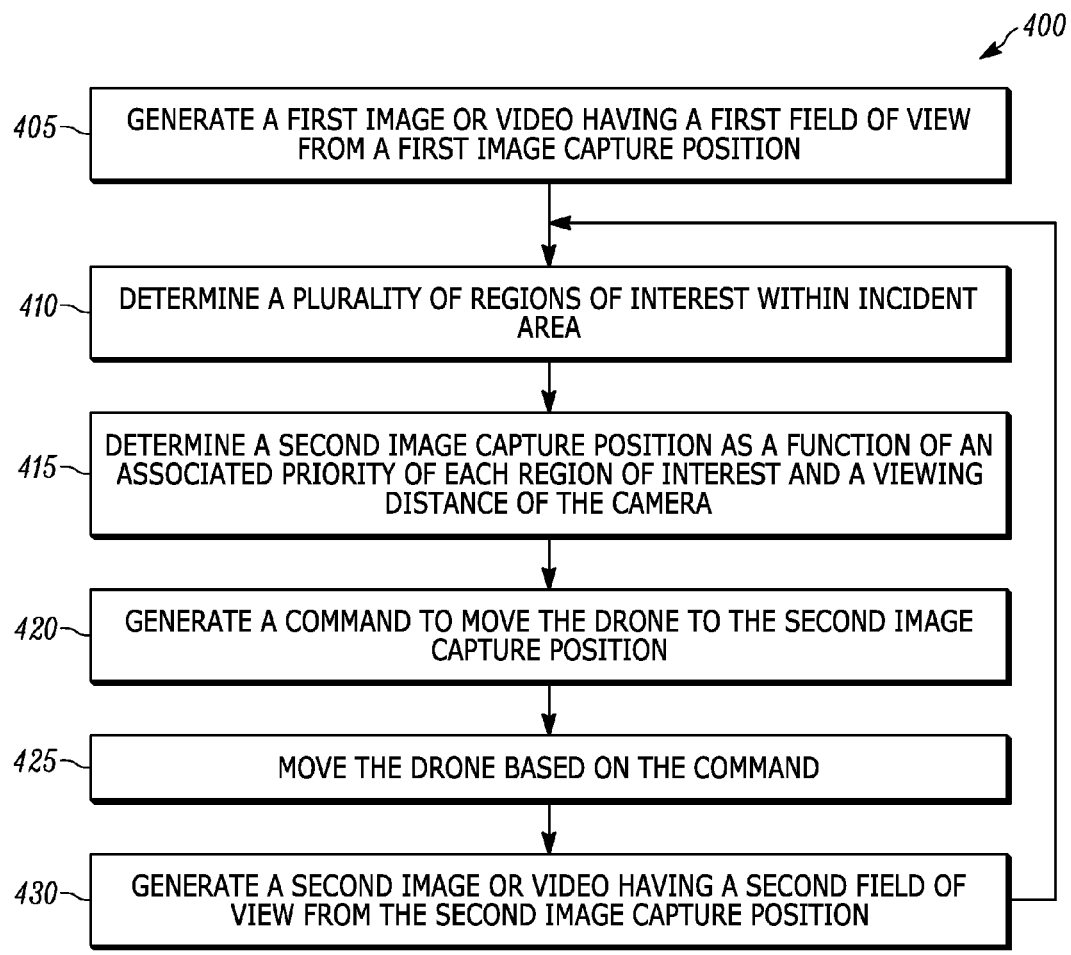
FIG. 4 is a flowchart of a method of adjusting a position of the drone of FIG. 2 once the drone is initially positioned at the incident area.

FIG. 4 illustrates a method 400 of adjusting a position of the drone 105 once the drone 105 is initially positioned in the first image capture position. For example, as time passes, the regions of interest within the incident area 115 and the associated priorities of the regions of interest within the incident area 115 may change. Such changes may occur when a victim wearing a tracking device leaves the incident area 115, which may remove a region of interest from the incident area 115. Another example of such a change may be when another incident occurs within the incident area 115 that creates additional victims, which may create additional regions of interest. Further examples include public safety personnel moving in between multiple locations within the incident area 115, leaving the incident area 115, or arriving at the incident area 115. The electronic processor 205 may control the drone 105 to move from the first image capture position to a second image capture position based on changes that occur at the incident area 115. Many aspects of the method 400 of FIG. 4 are similar to those of the method 300 of FIG. 3. Therefore, the description of such aspects (for example, determination of the regions of interest, determination of the associated priorities of the regions of interest, use of the known viewing distance of the camera 220, and use of the known blockage information) provided with respect to FIG. 3, applies to the method 400 as well.

As shown in FIG. 4, at block 405, the camera 220 generates a first image or video having a first field of view from the first image capture position. At block 410, the electronic processor 205 determines a plurality of regions of interest within the incident area 115. As explained above with respect to FIG. 3, the electronic processor 205 is configured to determine an associated priority for each region of interest. At block 415, the electronic processor 205 determines the second image capture position as a function of the associated priority of each region of interest and a viewing distance of the camera 220. In some embodiments, the electronic processor 205 may also determine the second image capture position as a function of the known blockage information. At block 420, the electronic processor 205 generates a command to move the drone 105 to the second image capture position. At block 425, the drone 105 moves to the second image capture position based on the command. At block 430, the camera 220 generates a second image or video having a second field of view from the second image capture position. The method 400 then proceeds back to block 410 to continue to monitor whether the position of the drone 105 should be adjusted to provide a different field of view of the incident area 115 based on the priorities of the regions of interest within the incident area 115.

Figure 5A:
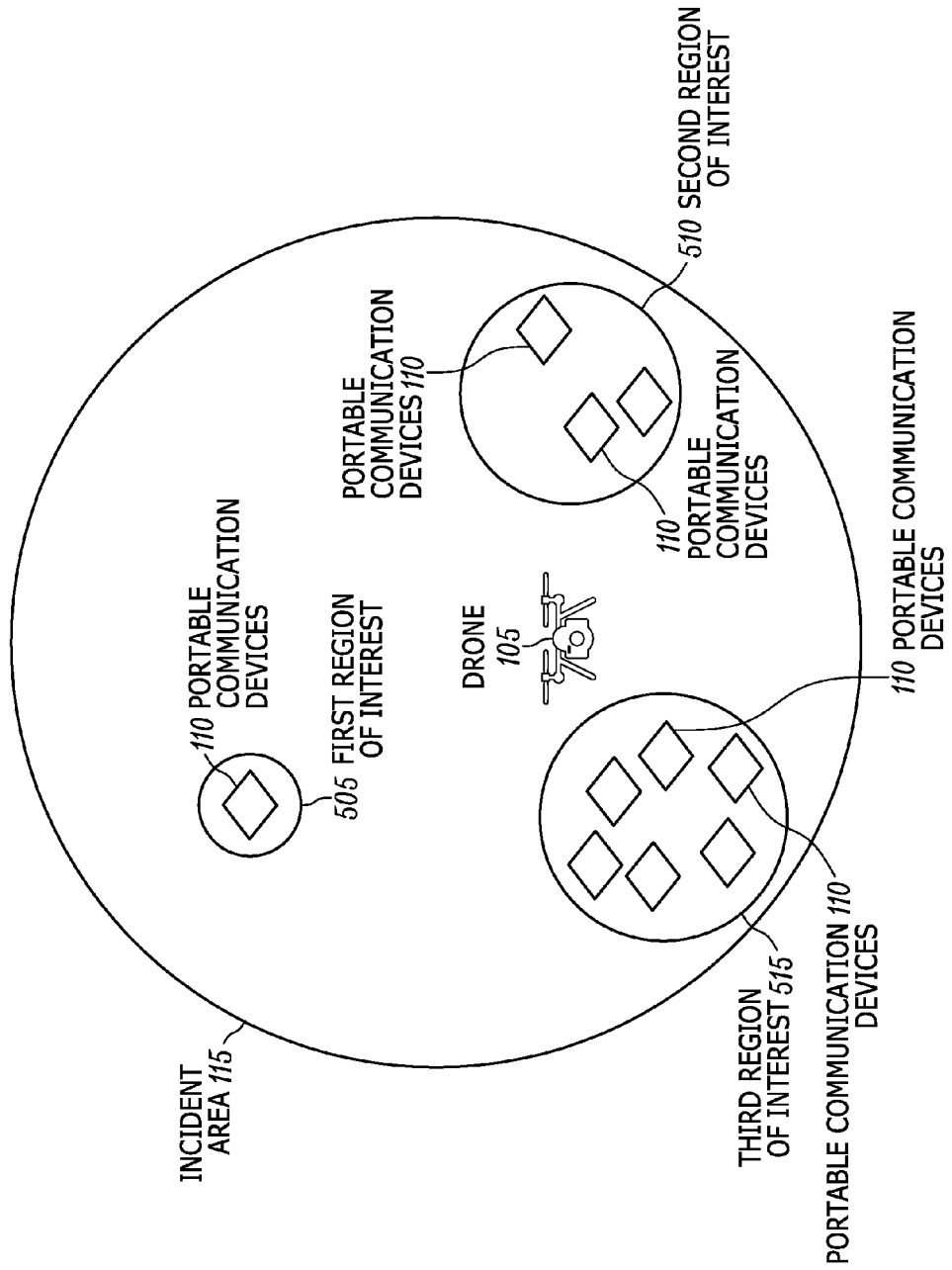
FIGS. 5A and 5B are block diagrams illustrating example situations in the incident area and example positions of the drone of FIG. 2 in each exemplary situation.
Figure 5B:
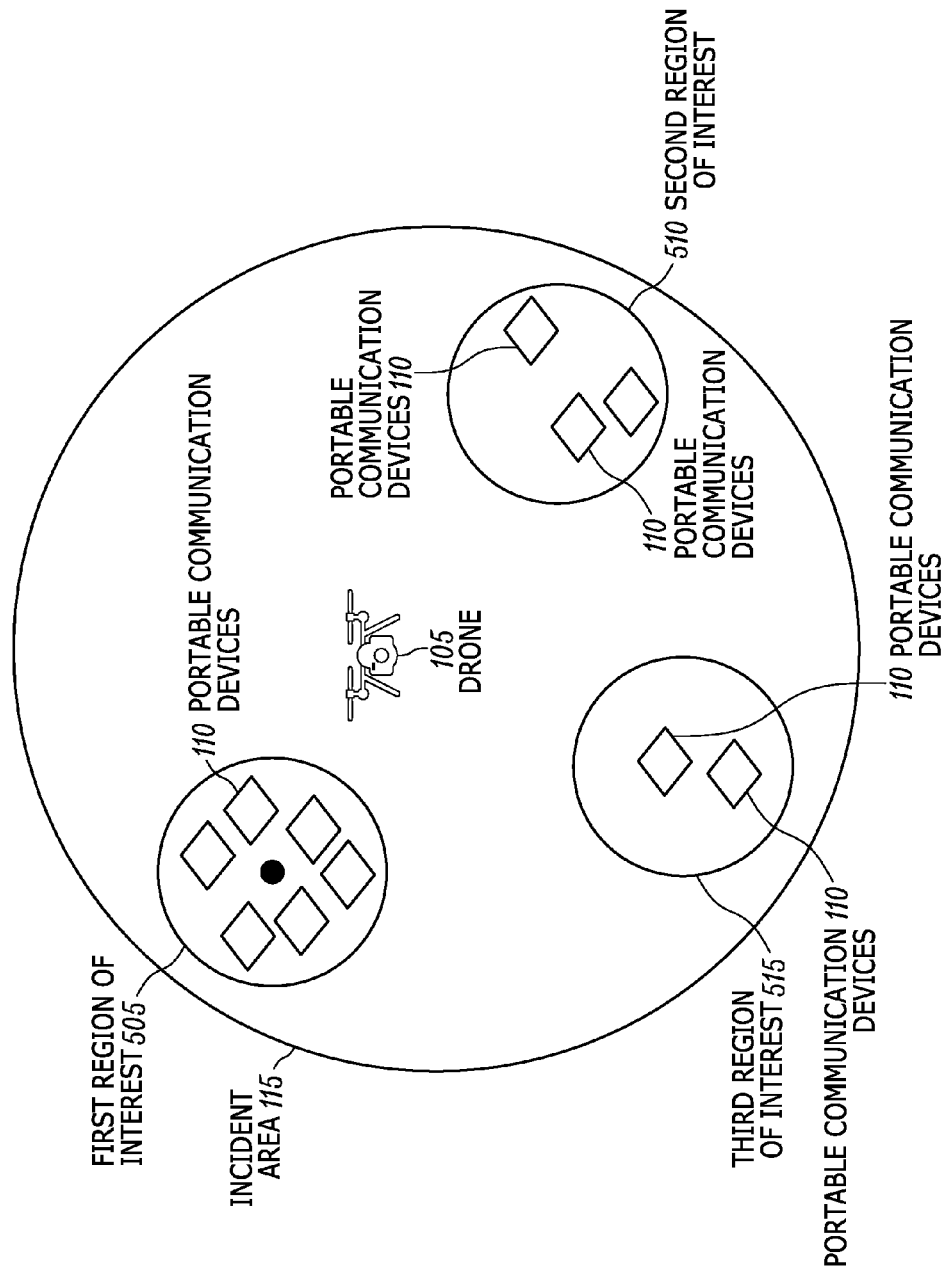

FIGS. 5A and 5B illustrate example situations in the incident area 115 and example positions of the drone 105 in each exemplary situation. As illustrated in FIGS. 5A and 5B, the incident area 115 includes numerous portable communication devices 110. As explained above, each plurality of portable communication devices 110 that are located within a predetermined distance from each other are determined to be located at a region of interest. As shown in FIGS. 5A and 5B, the incident area 115 includes a plurality of regions of interest that include a first region of interest 505, a second region of interest 510, and a third region of interest 515. In the exemplary incident area 115 of FIG. 5A, the third region of interest 515 is a high priority region of interest, the second region of interest 510 is a medium priority region of interest, and the first region of interest 505 is a low priority region of interest. Accordingly, as shown in FIG. 5A, the electronic processor 205 has positioned the drone 105 most closely to the third region of interest 515 to allow the camera 220 to capture an image or video of the third region of interest 515. The position of the drone 105 may also allow the camera 220 to capture an image or video of at least one of the second region of interest 510 and the first region of interest 505.

FIG. 5B illustrates the incident area 115 of FIG. 5A after a period of time has passed. As shown in FIG. 5B, the location of some of the portable communication devices 110 has changed over the period of time. Additionally, over the period of time, some portable communication devices 110 may have been removed from the incident area 115, and other portable communication devices 110 may have entered the incident area 115. The electronic processor 205 takes these changes into account when positioning the drone 105 within the incident area 115. In the exemplary incident area 115 of FIG. 5B, the first region of interest 505 is a high priority region of interest, the second region of interest 510 is a medium priority region of interest, and the third region of interest 515 is a low priority region of interest. Accordingly, as shown in FIG. 5B, the electronic processor 205 has adjusted the position of the drone 105 to move the drone 105 away from the third region of interest 515 with respect to the position of the drone 105 shown in FIG. 5A. Rather, as shown in FIG. 5B, the electronic processor 205 has positioned the drone 105 most closely to the first region of interest 505 to allow the camera 220 to capture an image or video of the first region of interest 505. The position of the drone 105 may also allow the camera 220 to capture an image or video of at least one of the second region of interest 510 and the third region of interest 515.

As illustrated in FIGS. 5A and 5B, the drone 105 is positioned within the incident area 115 based on the priority of the regions of interest 505, 510, and 515 with the incident area 115. As explained above, the drone 105 is also positioned within the incident area 115 based on the viewing distance of the camera 220 and the known blockage information. Such positioning of the drone 105 allows for efficient surveillance of an incident area 115.

Figure 6:
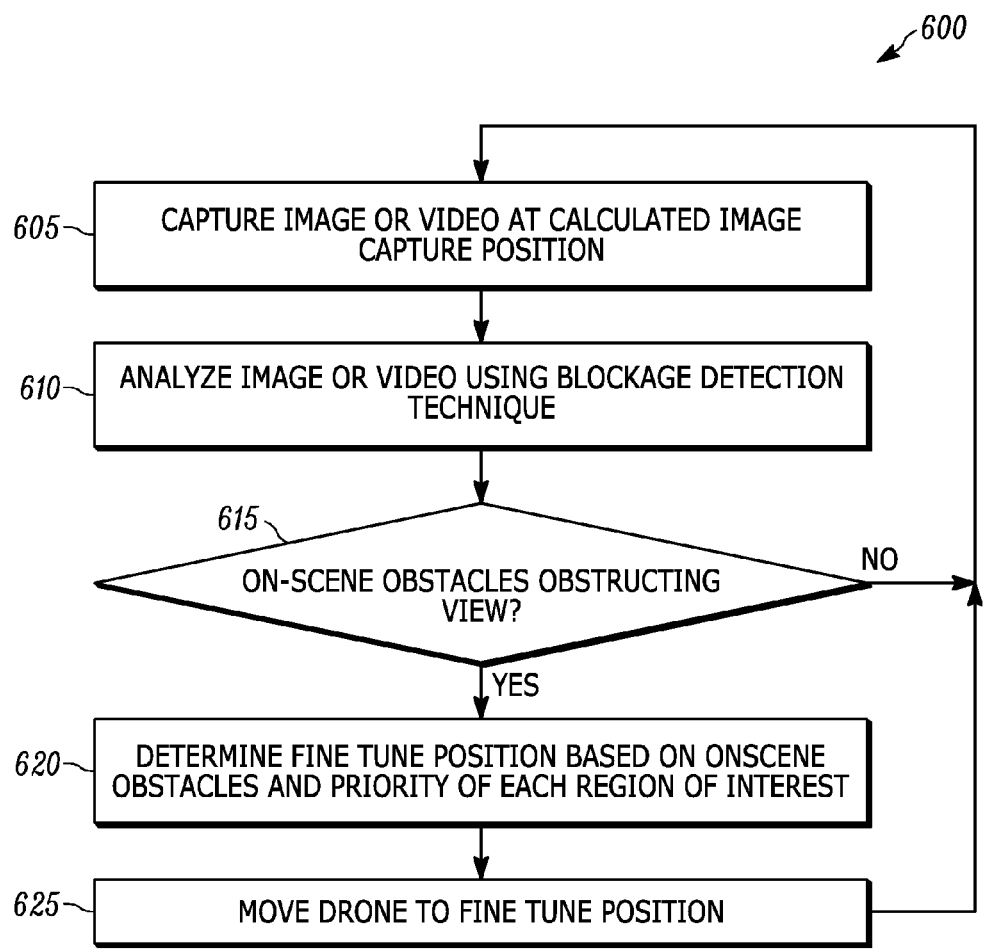
FIG. 6 is a flowchart of a method to refine the position of the drone of FIG. 2 based on on-scene obstacles.

In addition to positioning the drone 105 based on priority of regions of interest, viewing distance of the camera 220, and known blockage information, in some embodiments, the electronic processor 205 refines the position of the drone 105 based on on-scene obstacles. FIG. 6 illustrates a method 600 that may be executed by the electronic processor 205 to refine the position of the drone 105 based on on-scene obstacles. In some embodiments, the electronic processor 205 may execute the method 600 in parallel with the method 400 or may execute the method 600 in parallel with block 430 of the method 400. The electronic processor 205 executes the method 600 to provide less obstructed viewing angles of the incident area 115 by moving the drone 105 within a predetermined area to attempt to avoid on-scene obstacles.

At block 605, the camera 220 captures an image or video at the determined image capture position where the electronic processor 205 positioned the drone 105 based on priority of regions of interest, viewing distance of the camera 220, and known blockage information. At block 610, the electronic processor 205 analyzes the image or video captured by the camera 220 using a blockage detection technique. For example, the blockage technique may include media analytic algorithms and methodologies, motion estimation techniques, distance calculation techniques, or a combination thereof. At block 615, using the analysis from the blockage detection technique, the electronic processor 205 determines whether on-scene obstacles, such as trees or people, are obstructing the view of one or more of the regions of interest from the camera 220. For example, in some embodiments, on-scene obstacle information may be gathered relative to each region of interest viewable by the camera 220.

At block 620, the electronic processor 205 may use the on-scene obstacle information for each region of interest and the priority of each region of interest to determine a fine tune position of the drone 105. For example, the on-scene obstacle information relative to each of region of interest may be aggregated using a scoring system that takes into account the priority of each region of interest and how much each region of interest is obstructed by on-scene obstacles. In some embodiments, the electronic processor 205 may determine the fine tune position of the drone 105 that results in the least obstruction when accounting for the priority of the regions of interest. For example, the electronic processor 205 may determine the fine tune position of the drone 105 such that the camera 220 has an obstructed view of a low priority region of interest and has a less obstructed view of a high priority region of interest.

At block 625, the electronic processor 205 controls the drone 105 such that the drone 105 is moved to the fine tune position. For example, in some embodiments, the electronic processor 205 may be configured to adjust the fine tune position of the drone 105 in any direction within a one foot radius of the determined image capture position (in other words, a fine tune region) where the electronic processor 205 positioned the drone 105 based on priority of regions of interest, viewing distance of the camera 220, and known blockage information. Such adjustment of the position of the drone 105 may allow the camera 220 to capture an image or video of one or more of the regions of interest that is less obstructed by on-scene obstacles. The one foot radius of the fine tune region is merely exemplary. In some embodiments, the radius of the fine tune region may be less than or greater than one foot.

Figure 7:
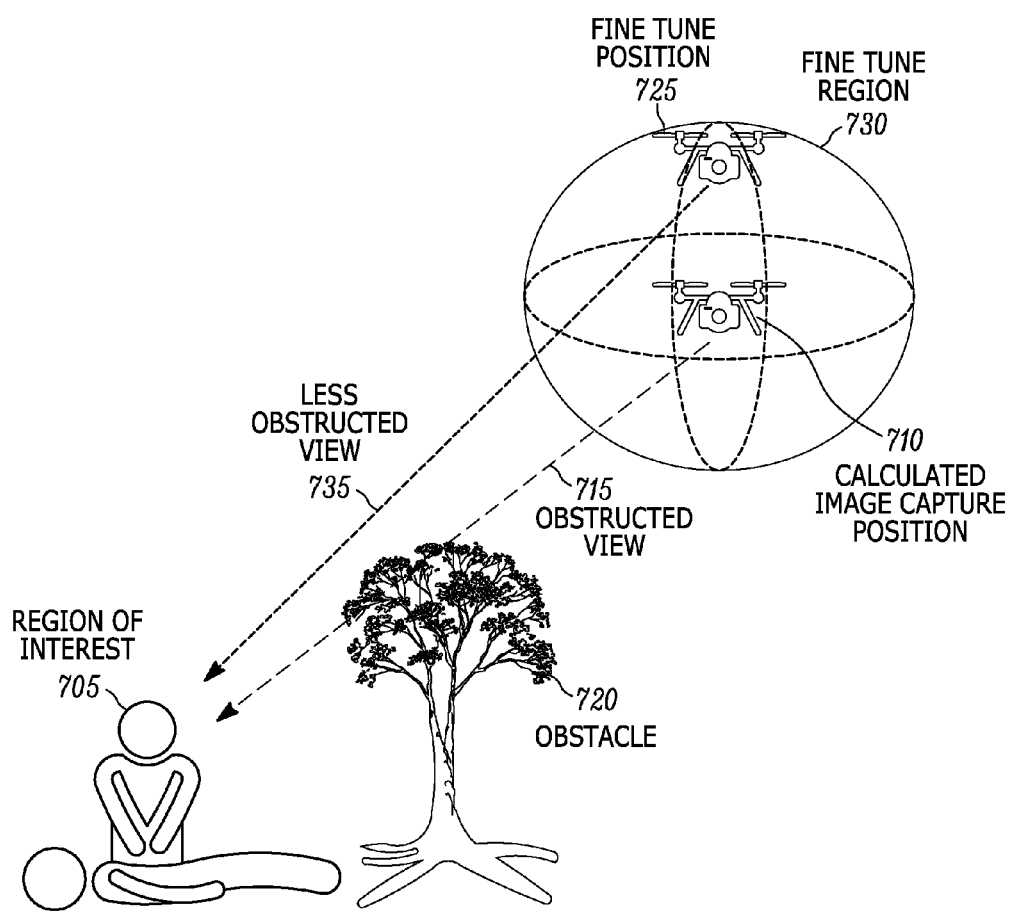
FIG. 7 is a block diagram illustrating exemplary locations of the drone of FIG. 2 positioned near a region of interest.

For example, FIG. 7 illustrates two exemplary locations of the drone 105 positioned near a region of interest 705. As shown in FIG. 7, a determined image capture position 710 of the drone 105 results in an obstructed view 715 of the region of interest 705 from the camera 220 due to an obstacle 720. Using the method 600 as described above, the electronic processor 205 may determine a fine tune position 725 of the drone 105 within a fine tune region 730. As shown in FIG. 7, when the drone 105 is positioned at the fine tune position 725, the camera 220 has a less obstructed view 735 of the region of interest 705.

In some embodiments of the drone 105, the electronic processor 205 may determine a highest priority region of interest. For example, the highest priority region of interest may be the region of interest where the most total amount of time has been spent by a group of the plurality of portable communication devices $110_A$ through $110_N$. Alternatively, the highest priority region of interest may be determined based on a location of a single portable communication device 110 within the incident area 115 (for example, a tracking device placed on a victim). In some embodiments, the electronic processor 205 may control the drone 105 to be positioned based solely on the location of the highest priority region of interest.

In some embodiments, the electronic processor 205 may control the camera 220 to capture an image or video at a viewing angle that includes a single region of interest (for example, the highest priority region of interest) and excludes some portion of the field of view of the camera 220. For example, the electronic processor 205 may control the camera 220 to provide a zoomed-in view of the highest priority region of interest. In some embodiments, the drone 105 is configured to receive commands from an external device (for example, the mobile control center 125 and the command center 130) that relate to the viewing angle of the camera 220. For example, based on received commands, the electronic processor 205 may control the camera 220 to provide a zoomed-in view of a single region of interest (for example, the highest priority region of interest) or a zoomed-out panoramic view of the incident area 115. In some embodiments, the electronic processor 205 controls the microphone 225 to capture audio from the direction of a single region of interest (for example, the highest priority region of interest). For example, the electronic processor 205 may control at least one of the microphone 225 and the drone 105 to move such that the microphone 225 faces the highest priority region of interest.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of positioning a drone including a camera, the method comprising:
    generating, from a first image capture position of the drone and with the camera, a first image or video having a first field of view;
    determining, with an electronic processor, a plurality of regions of interest, each of the plurality of regions of interest located within a predetermined area and having an associated priority;
    determining, with the electronic processor, the associated priority of each of the plurality of regions of interest based on an amount of time spent by a group of portable communication devices at each of the plurality of regions of interest;
    determining, with the electronic processor, a second image capture position relative to and different from the first image capture position for the drone as a function of the associated priority and a viewing distance of the camera;
    generating, with the electronic processor, a command for the drone to move to the second image capture position;
    moving the drone based on the command; and
    generating, from the second image capture position and with the camera, a second image or video having a second field of view.

2. A method as claimed in claim 1, further comprising determining, with the electronic processor, known blockage information, and wherein determining, with the electronic processor, the second image capture position for the drone includes determining, with the electronic processor, the second image capture position for the drone as a function of the known blockage information, the associated priority, and the viewing distance of the camera.

3. A method as claimed in claim 1, wherein determining, with the electronic processor, the plurality of regions of interest includes determining, with the electronic processor, the plurality of regions of interest based on geographic coordinates received from a portable communication device.

4. A method as claimed in claim 1, further comprising determining, with the electronic processor, a highest priority region of interest from the plurality of regions of interest.

5. A method as claimed in claim 4, further comprising
    generating, with the electronic processor, a second command for a microphone to be directed at the highest priority region of interest;
    moving at least one of the microphone and the drone to direct the microphone at the highest priority region of interest based on the second command; and
    generating, with the microphone, audio from the highest priority region of interest.

6. A method as claimed in claim 4, wherein generating, from the second image capture position and with the camera, the second image or video having the second field of view includes generating, from the second image capture position and with the camera, the second image or video having a viewing angle including the highest priority region of interest and excluding some portion of the first field of view.

7. A method as claimed in claim 1, further comprising, providing, with a communication system, at least one of the first image or video and the second image or video from the camera to an external device in approximately real-time.

8. A drone comprising:
    a camera configured to generate, from a first image capture position of the drone, a first image or video having a first field of view;
    an electronic processor configured to
        determine a plurality of regions of interest, each of the plurality of regions of interest located within a predetermined area and having an associated priority,
        determine the associated priority of each of the plurality of regions of interest based on an amount of time spent by a group of portable communication devices at each of the plurality of regions of interest,
        determine a second image capture position relative to and different from the first image capture position for the drone as a function of the associated priority and a viewing distance of the camera, and
        generate a command for the drone to move to the second image capture position,
    wherein the drone moves to the second image capture position based on the command and the camera is configured to generate, from the second image capture position, a second image or video having a second field of view.

9. The drone of claim 8, wherein the electronic processor is further configured to determine known blockage information and determine the second image capture position as a function of the known blockage information, the associated priority, and the viewing distance of the camera.

10. The drone of claim 8, wherein the electronic processor is configured to determine the plurality of regions of interest based on geographic coordinates received from a portable communication device.

11. The drone of claim 8, wherein the electronic processor is further configured to determine a highest priority region of interest from the plurality of regions of interest.

12. The drone of claim 11, further comprising a microphone, wherein the electronic processor is further configured to generate a second command for the microphone to be directed at the highest priority region of interest;
at least one of the microphone and the drone is moved to direct the microphone at the highest priority region of interest based on the second command; and
the microphone is configured to generate audio from the highest priority region of interest.

13. The drone of claim 11, wherein the second image or video has a viewing angle including the highest priority region of interest and excluding some portion of the first field of view.

14. The drone of claim 8, further comprising a network interface that provides at least one of the first image or video and the second image or video from the camera to an external device in approximately real-time.

* * * * *